(12) United States Patent
Phalen

(10) Patent No.: US 7,980,384 B2
(45) Date of Patent: Jul. 19, 2011

(54) TENSIONING DEVICE FOR DRAG CONVEYOR

(75) Inventor: Floyd C. Phalen, Hastings, MI (US)

(73) Assignee: Hapman, Inc., Kalamazoo, MI (US)

( * ) Notice: Subject to any disclaimer, the term of this patent is extended or adjusted under 35 U.S.C. 154(b) by 254 days.

(21) Appl. No.: 12/387,294

(22) Filed: Apr. 30, 2009

(65) Prior Publication Data

US 2010/0276259 A1     Nov. 4, 2010

(51) Int. Cl.
*B65G 23/44*     (2006.01)
(52) U.S. Cl. .......................................... 198/716; 198/813
(58) Field of Classification Search .......... 198/813–816, 198/716, 727–733, 735.1
See application file for complete search history.

(56) References Cited

U.S. PATENT DOCUMENTS

| 2,909,274 | A | * | 10/1959 | Koeske | 198/728 |
| 3,905,473 | A | * | 9/1975 | Jones et al. | 198/718 |
| 6,415,908 | B1 | * | 7/2002 | Ambs et al. | 198/716 |
| 6,516,941 | B1 | * | 2/2003 | Buhne | 198/813 |
| 6,598,736 | B2 | * | 7/2003 | Ellis et al. | 198/814 |
| 7,798,313 | B2 | * | 9/2010 | Hesketh | 198/814 |

* cited by examiner

*Primary Examiner* — Mark A Deuble
(74) *Attorney, Agent, or Firm* — Olson & Cepuritis, Ltd.

(57) ABSTRACT

An automatic chain tensioner for a tubular drag conveyor tensions the conveyor chain hydraulically utilizing an air-over-oil hydraulic system. A hydraulic cylinder acts on chain idler sprocket to tension the chain.

4 Claims, 4 Drawing Sheets

TENSIONING DEVICE FOR DRAG CONVEYOR

FIELD OF INVENTION

This invention relates to conveyors for particulate materials, more particularly to tubular drag conveyors.

BACKGROUND OF INVENTION

A tubular drag conveyor is a flight conveyor that has an endless chain and conveyor flight carried by the chain and situated within the confines of a tube or a tubular casing.

Products commonly handled by tubular drag conveyors include particulate materials such as granules, polymer beads and powders, sugar, detergents, seeds and the like. These conveyors are very well suited for use in food, chemical, and pharmaceutical industries.

For efficient operation of a tubular drag conveyor, maintaining of conveyor chain tension is of utmost importance. As the conveyor chain stretches and/or settles in several months after initial installation, chain tension requires periodic adjustment which often requires operational shut-down. The present drag conveyor chain tensioner ameliorates this problem by providing continuous, automatic chain tensioning during conveyor operation that minimizes the need for regular manual chain tension adjustments that are usually required.

SUMMARY OF THE INVENTION

A chain tensioner is provided in the idler sprocket turn of a tubular drag conveyor. The chain tensioner facilitates automatic maintenance of desired chain tension during the operation of a tubular drag conveyor without the need to shut down the conveyor by applying a substantially constant thrust to the conveyor chain.

The chain tensioner includes a hollow housing equipped with a carriage plate that is slidably mounted to the housing for reciprocating movement relative to the housing. A chain idler sprocket is carried by a shaft journaled in the carriage plate. The sprocket is adapted to receive the chain of the drag conveyor and is situated in the hollow housing. A double acting hydraulic cylinder is mounted to the housing, and the piston rod thereof is operably connected to the carriage plate so as to slidably position the carriage plate, and thus the chain idler sprocket carried by the carriage plate, to adjust or maintain a desired tension in the conveyor chain. Positioning of the carriage plate is effected by the double acting hydraulic cylinder with a piston rod operably connected, directly or indirectly, to the carriage plate so as to slidably position it as well as the chain idler sprocket. Preferably, the hydraulic cylinder is actuated by an air-over-oil hydraulic system.

DESCRIPTION OF THE PREFERRED EMBODIMENTS

Tubular drag conveyors embodying the present invention are useful for handling a wide variety of powdered or granular materials, including moderately abrasive, even sticky materials, and can operate for extended time periods without requiring manual adjustment of conveyor chain tension.

Figure 1:
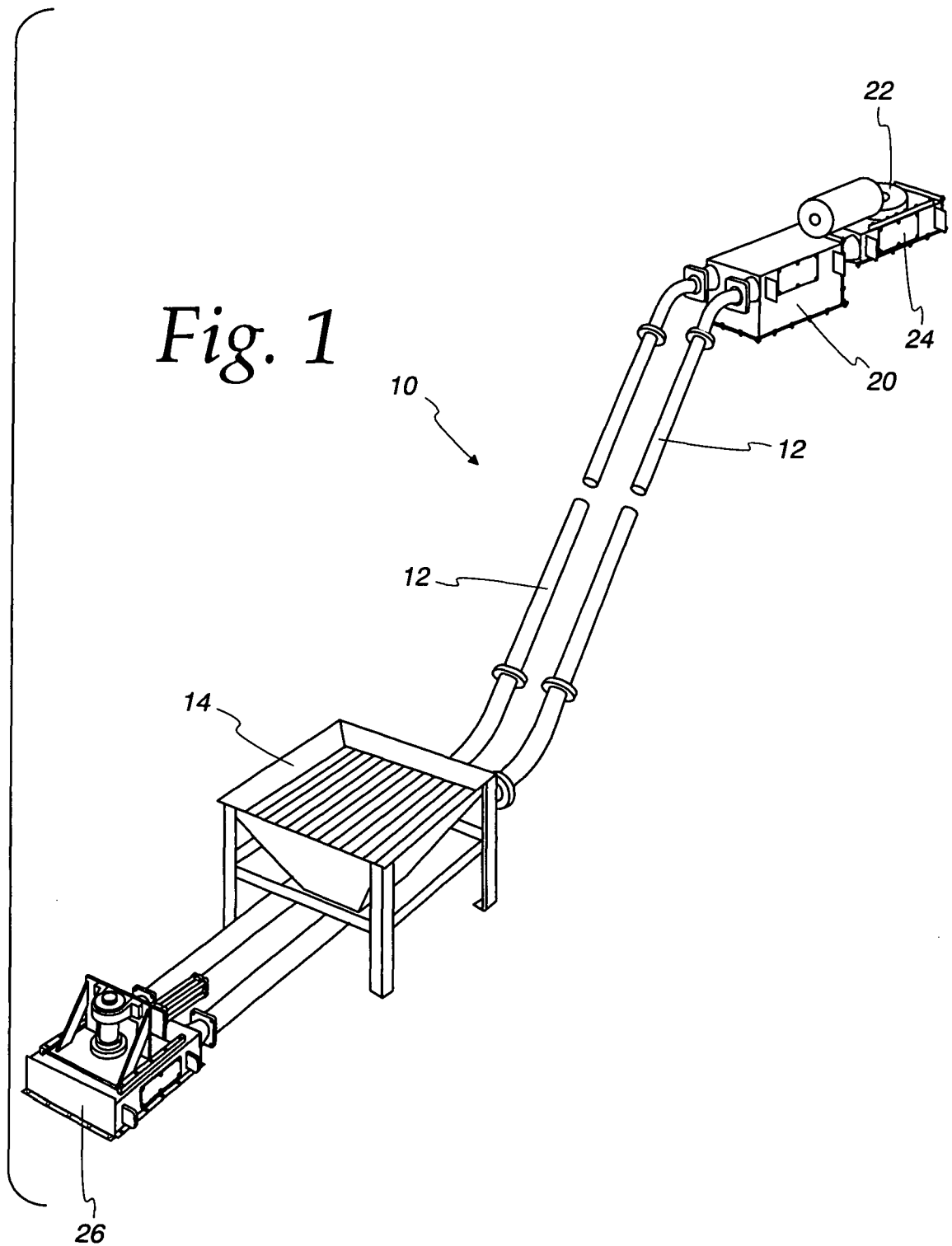
FIG. 1 is a perspective view of a tubular drag conveyor that embodies the present invention.

Referring to FIG. 1, tubular drag conveyor 10 includes tubular casing 12 that envelops the conveyor chain as well as conveyor flights carried by the chain (not shown). Conveyor 10 is provided with conveyor drive motor 22, drive sprocket turn 24 and chain tensioner 26 which includes an idler sprocket turn with an associated, hydraulically driven, automatic chain tensioning assembly described in detail hereinbelow. A feed hopper 14 and discharge hopper 20 communicate with tubular casing 12.

Figure 2:
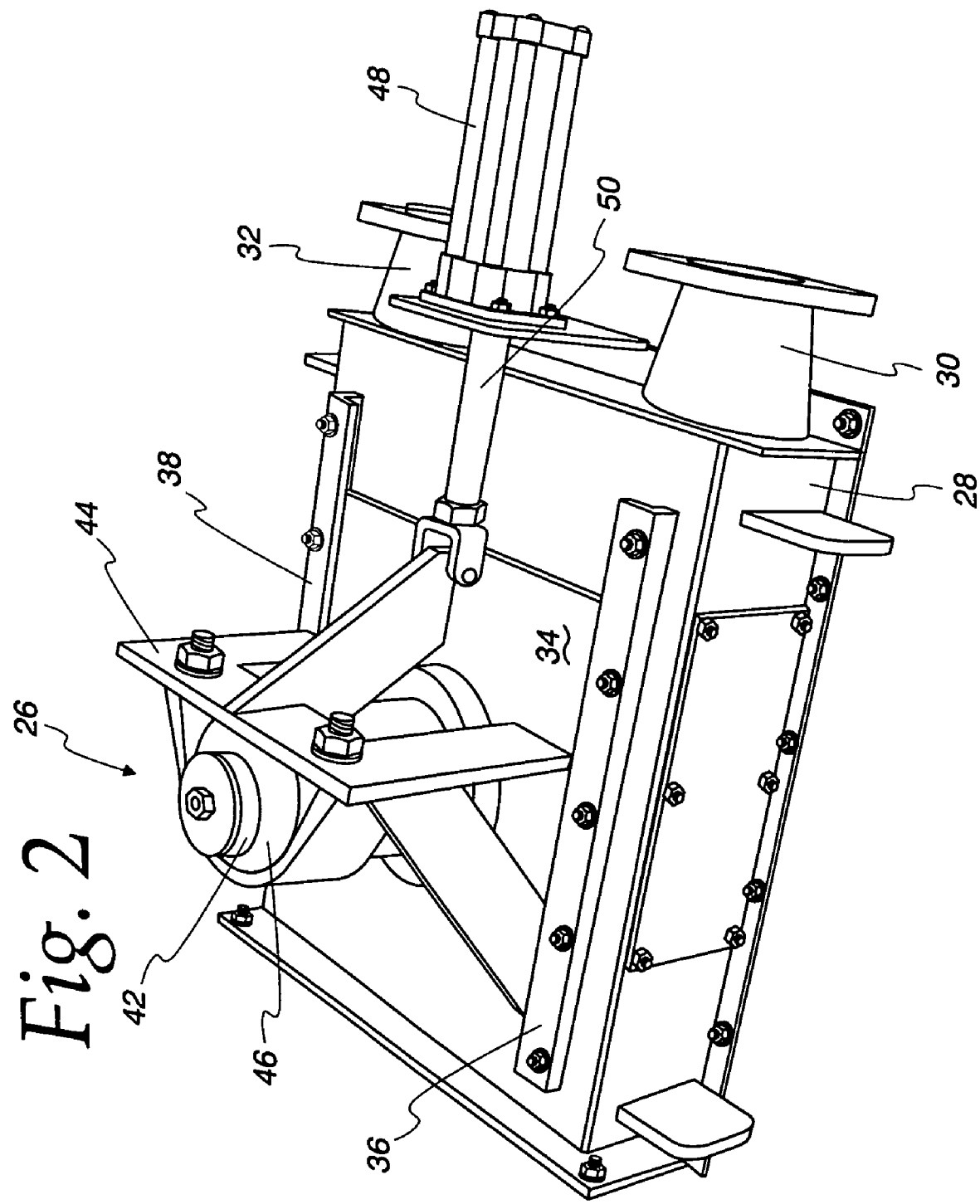
FIG. 2 is an enlarged perspective view of a drag chain tensioner embodying the present invention.
Figure 3:
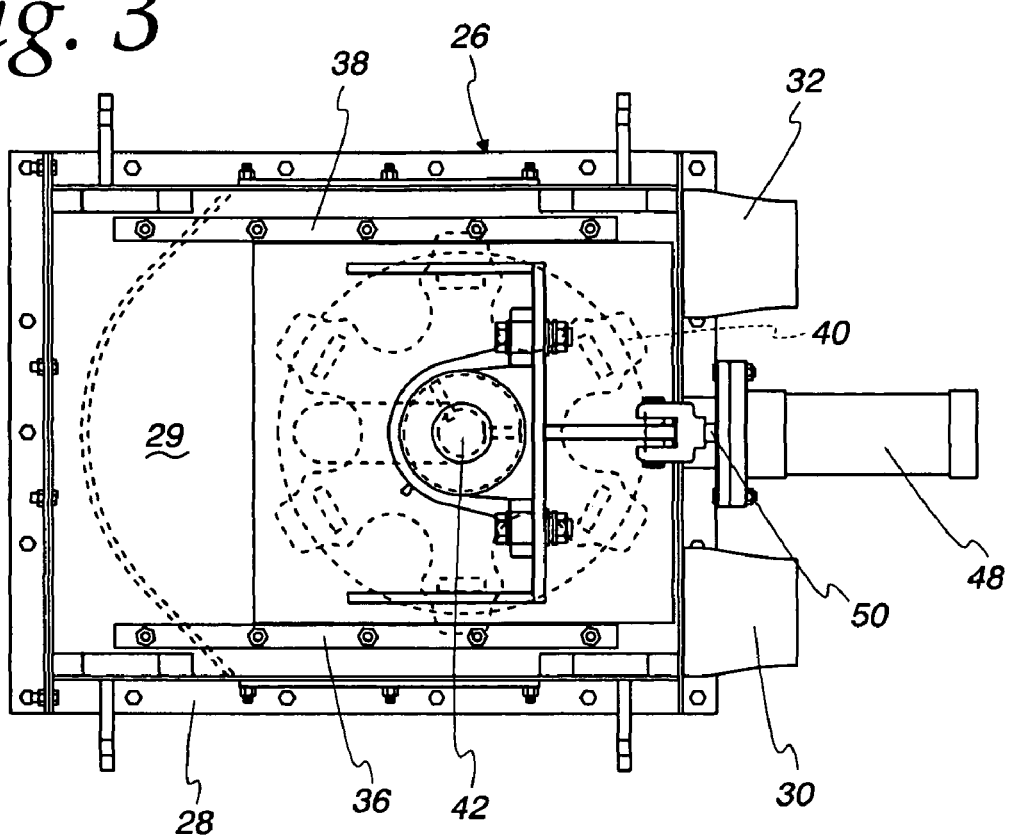
FIG. 3 is a top view of a drag chain tensioner assembly but with the drag chain omitted.
Figure 4:
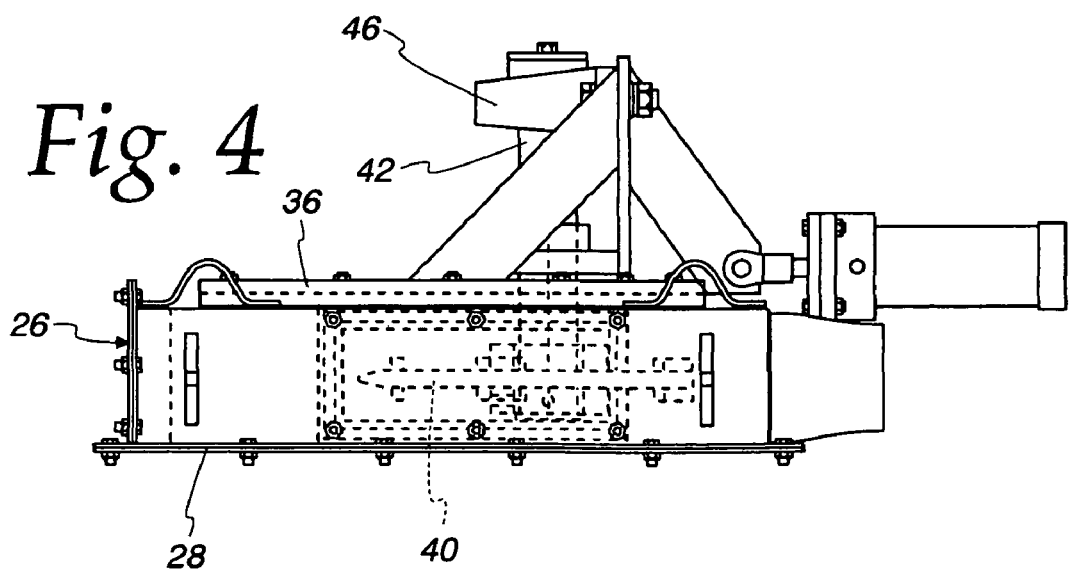
FIG. 4 is a side elevational view of the drag chain tensioner assembly shown in FIG. 3.

Chain tensioner 26 shown in FIGS. 2, 3 and 4 illustrates the features of the present invention. Chain tensioner 26 provides continuing chain tension as well as chain tension adjustment as needed. In particular, chain tensioner 26 includes hollow housing 28 containing therewithin chain idler sprocket 40. Housing 28 is provided with flanged chain ports 30 and 32 and defines an open top aperture 29 (FIG. 3). Carriage plate 34 is associated with sprocket 40 and is slidably mounted to the hollow housing 28 between guide rails 36 and 38 so as to occlude, at least in part, aperture 29.

Chain idler sprocket 40 is mounted to and carried by shaft 42 which, in turn, is journaled in carriage plate 34. Optional upstanding bracket 44 is fixed to carriage plate 34 and carries journal bearing 46 in which one end portion of shaft 42, the upper end portion as shown in FIGS. 2 and 4, is received.

Carriage plate 34 is received between guide rails 36 and 38, and is reciprocatable by double acting hydraulic cylinder 48 mounted to housing 28. Piston rod 50 of hydraulic cylinder 48 is pivotably connected to upstanding bracket 44 carried by carriage plate 34, but can be connected directly to carriage plate 34, if desired. As hydraulic cylinder 48 shifts the position of carriage plate 34, the position of chain idler sprocket 40 in housing 28 is altered as well, thereby tensioning or relaxing the tension on a conveyor chain engaged with sprocket 40 as needed. During operation, chain tensioner 26 provides substantially uniform thrust against the conveyor chain.

If desired, an "end-of-travel" indicator can be provided for chain tensioner 26 in any convenient manner, e.g., by providing a magnetic switch at the fully extended position of the hydraulic cylinder piston in hydraulic cylinder 48, and the like expedients.

Preferably, double acting hydraulic cylinder 48 is actuated utilizing an air-over-oil hydraulic system which utilizes compressed air for thrust and oil, i.e., hydraulic fluid, for control. In such systems, compressed air provides the thrust, while the hydraulic fluid controls speed and stroke of the hydraulic piston rod. Air piped to an air-over-oil reservoir forces the hydraulic fluid in the reservoir into the hydraulic cylinder. Flow controls and stop or control valves in the hydraulic fluid lines provide accurate and relatively smooth piston rod control.

Figure 5:
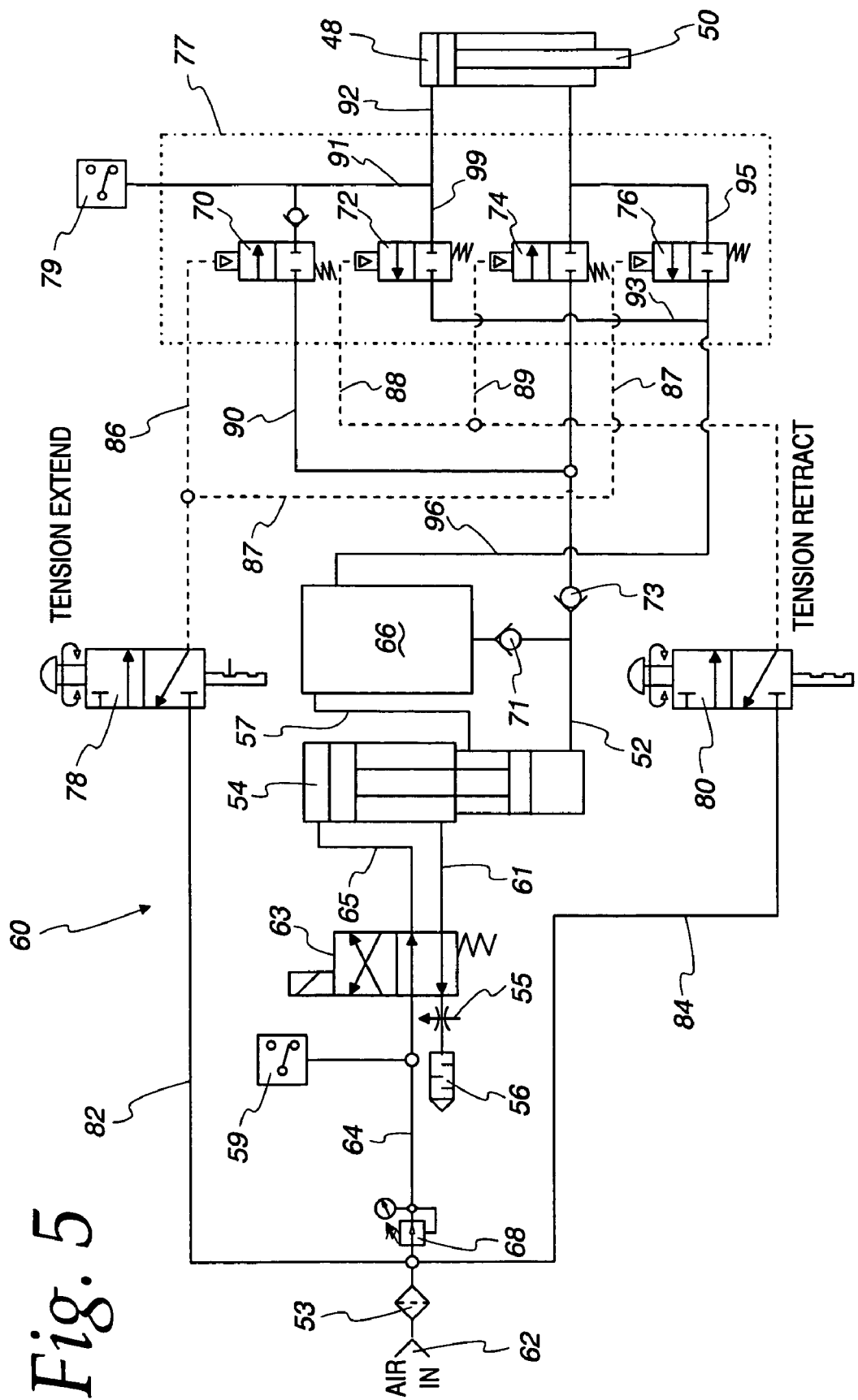
FIG. 5 is a pneumatic-hydraulic schematic of an air-over-oil hydraulic system suitable for actuating the drag chain tensioner shown in FIGS. 1-4, inclusive.

One such so-called air-over-oil hydraulic system, suitable for use in practicing the present invention, is shown in FIG. 5.

Referring to FIG. 5, air-over-oil hydraulic system 60 includes a compressed air source 62 that drives reciprocating pump 54 which, in turn, serves to pressurize hydraulic fluid reservoir 66 through line 57. Air pressure to the system is controlled by pressure regulator 68.

Compressed air is supplied to reciprocating pump 54 via air feed lines 51, 65 and 67 through solenoid actuated, two-way directional control valve 63. Optional filter 53 can be provided in line 51. Air from pump 54 is exhausted via line 61, through throttle valve 55, and into silencer 56. Line 57 provides hydraulic fluid venting for the return side of the pressure multiplier in pump 54.

Operation of hydraulic cylinder 48 and control of the stroke of piston rod 50 is controlled by pneumatically actuated, directional control valves 70, 72, 74 and 76 in manifold 77. Directional control valve actuation is effected by manually actuated air control valves 78 and 80. An air supply to control valves 78 and 80 is provided by lines 82 and 84, respectively. Air supply to the pneumatically actuated, directional control valves 70, 72, 74 and 76 is provided via lines 86, 87, 88, and 89, shown as interrupted lines in FIG. 5. To extend piston rod 50 and thus to tension a conveyor chain engaged with chain idler sprocket 40, valves 70 and 76 are actuated by manual manipulation of air control valve 78. On the other hand, to retract piston rod 50 and to relax or reduce tension in the conveyor chain, valves 72 and 74 are actuated by manual manipulation of air control valve 80.

For chain tensioning, actuation of control valves 70 and 76 supplies hydraulic fluid from reservoir 66 to hydraulic cylinder 48 via lines 67 and 69 through check valves 71 and 73 as well as lines 90, 91 and 92, while permitting return of hydraulic fluid to reservoir 66 via return lines 94, 95 and 96.

Similarly, to relax chain tension, actuation of control valves 72 and 74 supplies hydraulic fluid from reservoir 66 to hydraulic cylinder 48 via lines 67 and 69 through respective check valves 71 and 73 and further through lines 69, 97, 98 and 94, while permitting return of hydraulic fluid to reservoir 66 via lines 92, 99, 93 and 96.

Switches 59 and 79 provide confirmation of source air pressure in line 64 and hydraulic line pressure in line 92, respectively.

To set up a newly installed tubular drag conveyor, initial chain tension is set manually at the drive assembly that includes drive motor 22 and drive sprocket turn 24. The tensioner input air pressure is then adjusted to provide additional chain tension, usually about 20% over the manually set chain tension. During use, as the conveyor chain slackens, the tensioner input air pressure urges carriage plate 34 in a direction to take up the slack in the conveyor chain, thereby maintaining the desired, pre-set chain tension.

The foregoing discussion and the drawings are intended to be illustrative, but not limiting. Still other variations and rearrangements of parts are possible within the spirit and scope of the claimed invention.

I claim:

1. Chain tensioner for a tubular drag conveyor chain which comprises:
    a hollow housing;
    a carriage plate slidably mounted to the housing;
    a chain idler sprocket mounted to a shaft journaled in the carriage plate and situated in the hollow housing; and
    a double acting hydraulic cylinder provided with a single piston rod and mounted to the housing; said piston rod being operably connected to the carriage plate to slidably position the carriage plate and the chain idler sprocket in the housing.

2. The chain tensioner in accordance with claim 1 wherein the hydraulic cylinder is actuated by an air-over-oil hydraulic system.

3. The chain tensioner in accordance with claim 1 wherein the carriage plate is provided with an upstanding bracket carried by the carriage plate, and wherein the piston rod is pivotably attached to the bracket.

4. The chain tensioner in accordance with claim 3 wherein said upstanding bracket carries a journal bearing and wherein one end portion of said shaft is received in the journal bearing.

* * * * *